United States Patent [19]

Bokerman et al.

[11] 4,433,096

[45] Feb. 21, 1984

[54] POLYMERIZATION OF POLYDIORGANOSILOXANE IN THE PRESENCE OF FILLER

[75] Inventors: Gary N. Bokerman; Neal R. Langley, both of Midland, Mich.

[73] Assignee: Dow Corning Corporation, Midland, Mich.

[21] Appl. No.: 474,919

[22] Filed: Mar. 14, 1983

[51] Int. Cl.³ ............................................. C08K 3/10
[52] U.S. Cl. ...................... 524/783; 524/493; 524/588; 524/847; 524/860; 524/861; 524/862; 524/864; 524/865; 524/425; 524/495; 524/430; 524/431; 524/437; 524/445; 524/497; 528/23; 528/22
[58] Field of Search ............. 524/493, 588, 847, 860, 524/861, 862, 864, 865, 425, 495, 783, 430, 437, 431, 445, 497

[56] References Cited

U.S. PATENT DOCUMENTS

| | | | |
|---|---|---|---|
| 2,490,357 | 12/1949 | Hyde | 260/46.5 |
| 2,727,876 | 12/1955 | Iler | 260/37 |
| 2,883,366 | 4/1959 | Kantor et al. | 260/46.5 |
| 3,477,988 | 11/1969 | Ostrozynski | 260/46.5 |
| 3,692,737 | 9/1972 | Laur | 260/45.75 R |
| 4,008,261 | 2/1977 | Brown et al. | 260/448.2 E |
| 4,101,499 | 7/1978 | Herzig | 524/864 |
| 4,268,452 | 5/1981 | Mine et al. | 524/860 |

Primary Examiner—Melvyn I. Marquis
Attorney, Agent, or Firm—Edward C. Elliott

[57] ABSTRACT

A method of polymerizing hydroxyl-endblocked polydiorganosiloxane in the presence of filler, including acidic filler such as fumed silica, through the use of basic diorganosilanolates as catalysts is claimed. Preferred diorganosilanolates are tetra-n-butylphosphonium dimethylsilanolate and potassium dimethylsilanolate. The silicone polymer-filler mixture produced is useful in silicone greases and elastomers. Methods of combining the silicone polymer-filler mixture with various curing agents to yield curable compositions are claimed.

32 Claims, No Drawings

POLYMERIZATION OF POLYDIORGANOSILOXANE IN THE PRESENCE OF FILLER

BACKGROUND OF THE INVENTION

1. Field of the Invention

This invention relates to the polymerization of hydroxyl-endblocked linear polydiorganosiloxane to higher molecular weights while in the presence of fillers through the use of basic diorganosilanolates as catalysts.

2. Description of the Prior Art

Polydiorganosiloxane polymers are prepared by polymerization of monomers, neutralization of the catalyst, then stabilization of the polymer. If a filled polymer is desired, a filler is added to the neutralized polymer. When a reinforcing filler is added to a neutralized polymer, the polymer and filler may react to make a tough, nervy mass that is difficult to further process. In order to prevent this reaction, known as crepe aging, many methods are known for treating the reinforcing filler either before use or in situ, so that the mixture has a suitable storage life.

The incorporation of estersils into elastomers is taught by Iler in U.S. Pat. No. 2,727,876, issued Dec. 20, 1955. He identifies estersils as an organophilic solid in a supercolloidal state of subdivision, having an internal structure of inorganic siliceous material with a specific surface are of at least 1 m²/g, having chemically bound to said internal structure —OR groups wherein R is a hydrocarbon radical having from 2 to 18 carbon atoms. Iler notes that an estersil may be incorporated into a silicone during the formation of the elastic gum. He points out that it is customary to mill silicones with catalyst during the polymerization to form elastic gums, as shown in Agens U.S. Pat. No. 2,448,756, issued Sept. 7, 1948, and estersils may advantageously be milled into the silicone at this stage. The Agens patent teaches a process of making a solid, elastic, curable methylpolysiloxane by condensing a liquid polymeric dimethylsiloxane with an iron halide such as ferric chloride.

There are many known methods of preparing polydiorganosiloxane polymers. Hyde in U.S. Pat. No. 2,490,357, issued Dec. 6, 1949, teaches a method in which cyclic diorganosiloxanes are contacted with an alkali metal hydroxide. Kantor et al. in U.S. Pat. No. 2,883,366, issued Apr. 21, 1959, discloses a method of increasing the molecular weight of an organopolysiloxane by contacting an organopolysiloxane with a quaternary phosphonium compound until an increase in molecular weight is effected, then heating the resulting product to decompose the quaternary phosphonium compound. Brown et al. in U.S. Pat. No. 4,008,261, issued Feb. 15, 1977, describe a method of making phosphorus-containing catalysts suitable for polymerizing polyorganosiloxanes. Ostrozynski in U.S. Pat. No. 3,477,988, issued Nov. 11, 1969, teaches that quaternary bases, such as tetraalkylphosphonium silanolate are useful catalysts for rearrangement of organopolysiloxanes. He teaches that the rearrangement rates are increased by use of another organophosphorus promoter compound. He teaches that cyclic and other low molecular weight polysiloxanes can be rearranged with or without endblocking units to higher molecular weight polymers. High molecular weight polysiloxane can be arranged to lower polymers. His rearrangement method using base catalysts and his promoter is taught to inhibit silanol condensation in combination with diorganocyclosiloxanes and water. One of his embodiments teaches rearrangement in the presence of filler, for example low molecular weight diorganocyclosiloxane and silica filler are polymerized by a base-catalyzed rearrangement in the presence of a promoter to yield a highly viscous, opaque substance resembling grease. He teaches the rearrangement is not possible without the organophosphorus promoter compound. His Example 18 shows that mixed cyclic dimethylsiloxanes, silica filler, and potassium silanolate catalyst do not polymerize without the hexamethylphosphoramide promoter.

Laur in U.S. Pat. No. 3,692,737, issued Sept. 19, 1972, teaches that polydiorganosiloxane gums are usually prepared by alkaline polymerization methods. These methods provide gums which contain alkaline residues which must be carefully neutralized in order to obtain a satisfactory product. Even after careful neutralization, residues in amounts such as 10 to 20 parts per million based on the weight of the gum remain which are then stabilized by the addition of small amounts of finely divided silica. Laur then teaches that fume titanium dioxide used in place of the silica provides a more stable gum.

SUMMARY OF THE INVENTION

Mixtures of polydiorganosiloxane and filler are economically prepared by mixing low viscosity hydroxyl-endblocked polydiorganosiloxane and filler, then polymerizing the polydiorganosiloxane to a higher viscosity through the use of a basic diorganosilanolate catalyst. The method reduces the amount of energy required to disperse the filler in the polydiorganosiloxane because the mixing is done while the polydiorganosiloxane has a relatively low viscosity. The mixture is storable at room temperature without the separate addition of treated filler or filler treating agents.

The mixture can be further combined with known systems, useful for producing curable mixtures of hydroxyl-containing polydiorganosiloxane and curing agent, to yield curable compositions. The curable compositions can be cured to yield silicone elastomers.

DESCRIPTION OF THE INVENTION

This invention relates to a method of polymerizing a hydroxyl endblocked polydiorganosiloxane in the presence of filler comprising (A) mixing (i) 100 parts by weight of polydiorganosiloxane of the formula

HO(R$_2$SiO)$_x$H wherein each R is a monovalent radical having from 1 to 18 carbon atoms selected from the group consisting of hydrocarbon radicals, halogenated hydrocarbon radicals, or cyanoalkyl radicals, and x is from 3 to 200 and (ii) from 1 to 150 parts by weight of filler selected from the group consisting of inorganic reinforcing filler and inorganic extending filler to form a mixture, (B) admixing sufficient catalyst of the formula

MO(R$_2$SiO)$_z$Q wherein M is an alkali metal, tetraalkylphosphonium, or tetraalkylammonium radical; Q is an alkali metal, tetraalkylphosphonium, tetraalkylammonium, or hydrogen radical; R is as defined above; and z is at least 1, to cause condensation of the polydiorganosiloxane (i), and (C) dehydrating the mixture by heating, at a temperature below that at which decomposition of the catalyst would occur, removing moisture for a time sufficient to polymerize the mixture, then (D) inactivating the catalyst, to yield a stable silicone polymer-filler mixture in which the silicone polymer has a molecular weight greater than that of (i).

Previously, mixtures of polydiorganosiloxane of relatively high viscosity and fillers were prepared by mixing the filler into the high viscosity polymer using strong mixers and large amounts of energy; because of the high viscosity of the polymer and the even higher viscosity of the mixture. In cases where the filler was a reinforcing filler of finely divided silica, it was also necessary to include a filler treating agent to prevent crepe hardening of the mixture upon storage. The instant method provides filled polydiorganosiloxane suitable for use in greases, sealants, or elastomers at a lower cost due to decreased energy requirements and without the use of filler treating agents.

It was completely unexpected that a basic catalyst such as used in this invention would still operate to catalyze the condensation of the hydroxyl endblocked polydiorganosiloxane in the presence of reinforcing and extending fillers, especially those fillers which are acidic, because such fillers have been used in the past to neutralize basic catalysts used in such polymerizations. Laur taught that the effect of alkaline residues left in polydiorganosiloxane gums by the polymerization process could be stabilized by the addition of small amounts of finely divided silica, or by from 0.1 to 2 parts by weight of fume titanium dioxide.

The polydiorganosiloxane (i) used in this invention is of the average formula $$HO(R_2SiO)_xH$$

wherein each R is a monovalent radical having from 1 to 18 carbon atoms, selected from the group consisting of hydrocarbon radicals, halogenated hydrocarbon radicals, or cyanoalkyl radicals and x is from 3 to 200. Monovalent hydrocarbon radicals include alkyl radicals such as methyl, ethyl, isopropyl, and butyl; alkenyl radicals such as vinyl and allyl; and aryl radicals such as phenyl, tolyl, xylyl, and xenyl. Halogenated monovalent hydrocarbon radicals include aliphatic groups such as chloromethyl, 3-chloropropyl, 3,3,3-trichloropropyl, and perfluoroalkyl groups such as 3,3,3-trifluoropropyl; aromatic groups such as dichlorophenyl and tetrabromoxenyl; and aralkyl groups such as chlorobenzyl and beta-(chlorophenyl)ethyl. Cyanoalkyl radicals include cyanomethyl, beta-cyanoethyl, and gamma-cyanopropyl. The preferred radicals are methyl, ethyl, vinyl, phenyl, 3,3,3-trifluoropropyl, and 2-cyanoethyl. Each R may be the same or different, the polydiorganosiloxane can be a homopolymer or a copolymer. While the polydiorganosiloxane (i) is shown as having exactly 2 organic groups for each silicon atom, it is to be understood that (i) can have incorporated therein trace amounts of $R_3SiO_{1/2}$ units, $RSiO_{3/2}$ units, and $SiO_{4/2}$ units that are normally present in commercial polydiorganosiloxanes, where R is any of the organic radicals defined above.

The polydiorganosiloxane is a relatively low viscosity fluid. The degree of polymerization is from 3 to 200 on an average basis. The viscosity of the polymer is below 1 Pa·s at 25° C.

The method of this invention is operable with the fillers normally used in silicone rubber compositions. The fillers can be either inorganic reinforcing fillers such as colloidal silica, fumed titanium dioxide, and carbon black; or inorganic extending fillers such as ground quartz, aluminum oxide, zirconium silicate, magnesium oxide, zinc oxide, talc, diatomaceous earth, iron oxide, calcium carbonate, clays, titanium dioxide, mica, glass, and graphite. Colloidal silica is such as fumed silica and precipitated silica. The preferred types of fillers are fumed silica and calcium carbonate.

Because the filler is present during the polymerization of the polydiorganosiloxane, the amount and type of filler has an effect upon the polymerization reaction rate. If an acidic filler, such as fume silica, is used, the filler has an inhibiting effect upon the polymerization and the upper amount of filler that can be used is limited for this reason. When practical reaction times are used, the amount of acidic filler is limited to a range of from 1 to 40 parts by weight per 100 parts by weight of polydiorganosiloxane. When an acidic filler such as colloidal silica is used, the amount of total surface area present appears to be a limiting factor in the preferred amount of acidic filler used. The total surface area is obtained by multiplying the weight of filler present times the filler surface area per unit weight. An amount of total surface area can be obtained by using a low weight of a high surface area filler or a higher weight of a lower surface area filler. For purposes of this invention, an acidic filler is one which gives a pH of less than 7 when a 2 percent by weight slurry is prepared with distilled water.

When the filler is neutral or basic, from 1 to 150 parts by weight of filler per 100 parts by weight of polydiorganosiloxane can be present during the polymerization. For example, when 120 parts by weight of calcium carbonate is mixed with 100 parts of hydroxyl-endblocked polydimethylsiloxane fluid, polymerization takes place on heating to 105°–115° C. under dry nitrogen at a pressure of 1.5 kPa in a few minutes when catalyzed with 1 mole of tetra-n-butylphosphonium dimethylsilanolate for each 3000 gram-atoms of silicon in the polydimethylsiloxane.

The polymerization of the polydiorganosiloxane (i) in the presence of filler (ii) is catalyzed with a diorganosilanolate of the formula $$MO(R_2SiO)_zQ$$

wherein M is an alkali metal, tetraalkylphosphonium, or tetraalkylammonium radical; Q is an alkali metal, tetraalkylphosphonium, tetraalkylammonium, or hydrogen radical; R is a monovalent radical having from 1 to 18 carbon atoms selected from the group consisting of hydrocarbon radicals, halogenated hydrocarbon radicals, or cyanoalkyl radicals; and z is at least 1. Such catalysts are known in the art as useful for the polymerization of polydiorganosiloxanes and/or polydiorganocyclosiloxanes to higher molecular weight. It was unexpected that polymerization of the polydiorganosiloxane takes place in the presence of filler, more particularly in the presence of acidic filler such as fumed silica while using a catalyst which is basic.

The catalysts used in this invention are known in the art. Hyde discusses in his patent that it appears that the alkali metal hydroxide may be initially reacted with a corresponding diorganosilicon compound, such as a cyclic organosiloxane, in proportion to form an alkaline metal salt. The alkaline metal hydroxide is mixed with a diorganosilicon compound or low molecular weight diorganosiloxane and dehydrated for use in this invention. Kantor et al. describe the transfer of their quaternary phosphonium hydroxide catalyst to a substantially anhydrous organosiloxane solution. For this invention, a quaternary phosphonium compound of the formula $$R'_4POR''$$

wherein R' is a monovalent hydrocarbon radical of 1 to 18 carbon atoms free of aliphatic unsaturation and R" is hydrogen or alkyl radical of 1 to 6 carbon atoms is mixed with a low molecular weight diorganosiloxane and the mixture is dehydrated in the manner taught by Kantor et al. Brown et al. teach another method of producing a quaternary phosphonium diorganosilanolate. For this invention, the catalyst is the product obtained by mixing a quaternary phosphonium compound of the formula $$R'_4PX$$

wherein each R' is as defined above and X is chlorine, bromine, or iodine; a basic compound of the formula MOH where M is an alkali metal; and water, in at least sufficient quantity to dissolve the basic compound; with benzene-soluble diorganosilicon compound and dehydrating the mixture. For purposes of this invention diorganosilicon compound includes cyclic diorganosiloxanes such as hexamethylcyclotrisiloxane, organopolysiloxanes of the formula $$R_aSiO_{(4-a)/2}$$

where R is as defined above and a is from about 1.2 to about 2.5, and benzene-soluble organosilicon compound of the average unit formula $$R_aSiO_{(4-a-b)/2}$$
$$|$$
$$(OH)_b$$

where R is as defined above, a has an average value of from 1 to 3, and b has an average value of from 0 to 1.

The tetraalkylphosphonium diorganosilanolates such as tetra-n-butylphosphonium dimethylsilanolate can be produced by reacting tetraalkylphosphonium chloride with sodium dimethylsilanolate and removing the salt. Methods of producing phosphonium diorganosilanolates are described by Kantor et al. in U.S. Pat. No. 2,883,366, issued Apr. 21, 1959, and by Brown et al. in U.S. Pat. No. 4,008,261, issued Feb. 15, 1977, both of which are hereby incorporated by reference to show the method of producing. This type of catalyst has the feature of being decomposed at elevated temperatures into catalytically inactive, volatile substances which are easily removed from the polydiorganosiloxane product.

The potassium diorganosilanolate is produced by reacting potassium hydroxide with polydiorganocyclosiloxane under reflux conditions and removing water from the reaction mixture with a device such as a Dean-Stark Trap. Potassium diorganosilanolate, in common with other alkali base metal catalysts, is quite stable to heat and remains persistent in its action. For this reason, after the polydiorganosiloxane has been polymerized to the desired degree, this catalyst must be deactivated by neutralization, carbon dioxide being a particularly convenient neutralizing agent.

The preferred catalysts are potassium dimethylsilanolate and tetra-n-butylphosphonium dimethylsilanolate.

The amount of catalyst necessary in the polymerization reaction is dependent upon the amount and kind of filler present, the reaction temperature and pressure, and the amount of time allowed for polymerization to take place. Higher amounts of catalyst cause faster reaction rates at a given set of reaction conditions. Practical catalyst levels appear to be greater than 1 atom of phosphorus or potassium per 10,000 atoms of silicon in the polydiorganosiloxane. When an acidic filler is used at preferred levels, the amount of catalyst necessary is thought to be greater than 1 atom of phosphorus or potassium per 5000 atoms of silicon. The upper limit for catalyst amount is not critical, but it does not appear necessary to use more than 1 atom of phosphorus or potassium per 1000 atoms of silicon.

The method of this invention polymerizes low molecular weight hydroxyl-endblocked polydiorganosiloxanes in the presence of filler into higher molecular weight polymers by condensation of the hydroxyl groups in the presence of a basic diorganosilanolate catalyst. In order for the condensation reaction to take place and the polymerization to proceed, any water generated by the reaction or present in the system must be removed from the reaction mixture. This dehydration of the mixture is by heating at a temperature below that at which decomposition of the catalyst would occur and removing moisture from the mixture. The dehydrating by heating and removing moisture must be continued for a time sufficient to polymerize the mixture.

The initial step of the method is the dispersion of the filler into the polydiorganosiloxane fluid. The more uniformly and completely the filler particles are dispersed into the fluid, the more uniform will be the final filled polydiorganosiloxane. The mixture is then placed into a container capable of stirring the mixture during the polymerization, heating the mixture, and subjecting the mixture to reduced pressure to aid in the removal of water. A stirrer equipped resin kettle with heater, condenser, Dean-Stark water trap, and vacuum attachment is suitable, as is a similarly equipped dough mixer.

After placing the mixture into the container, catalyst is added to the mixture. The catalyzed mixture is stirred while being heated, as to from 100° C. to 160° C., applying a reduced pressure to the kettle to dehydrate the mixture. When the catalyst is tetraalkylphosphonium diorganosilanolate it is preferable that the temperature be below 130° C. The lower the pressure, the more rapid the water is removed and the more rapid the polymerization. Useful pressures have varied from about 0.8 kPa to about 11 kPa with the polymerization being more rapid at the lower pressures.

Water present in the system is removed in order to polymerize the polydiorganosiloxane (i). The water can be removed after the addition of the catalyst as discussed above, or it can be removed before adding the catalyst. If the water present in the system is removed before adding the catalyst, the mixture can be heated to any convenient temperature, for instance from 100° C. up to the boiling point of (i). The water is removed from the system by drawing a vacuum on the container and drawing out the water, by passing a dry inert gas through the container and thus sweeping the water out, or by a combination of both.

If the mixture is first dried as above, then the catalyst is added, it may be necessary to cool the mixture before catalyst addition. When the catalyst is an alkaline metal diorganosilanolate, it is not necessary to cool the mixture, but since both the tetraalkylphosphonium diorganosilanolate and the tetraalkylammonium diorganosilanolate are deactivated by heat, it is necessary to cool the mixture to a temperature below the deactivation temperature of the catalyst being used. After the catalyst is added, the polymerization produces water which must be removed in order for polymerization to proceed.

After the polydiorganosiloxane is polymerized through a condensation reaction to the desired degree, the catalyst is inactivated. If a tetraalkylphosphonium diorganosilanolate catalyst is used, the inactivation consists of decomposing the catalyst by heating to an elevated temperature, for example from 160° C. to 200° C. when tetra-n-butylphosphonium dimethylsilanolate is used. When potassium dimethylsilanolate is used, it is necessary to neutralize by the addition of an acidic material, preferrably a weak acid such as carbon dioxide.

The silicone polymer-filler mixture obtained by following the method of this invention can be used in producing products in a manner similiar to those used in producing products from the conventional filled polydiorganosiloxane obtained by polymerizing a polydiorganosiloxane to the desired viscosity and then adding filler by mixing in a high strength mixer such as a dough mixer or a two-roll mill. The method of this invention yields a silicone polymer-filler mixture with a significantly lower net energy requirement, therefore at a lower cost than the conventional production method. The silicone polymer-filler mixture is a storage stable mixture. It does not require the presence of treated filler to prevent crepe-aging of the mixture over a period of time as is necessary with the conventional method of mixing a high viscosity polydiorganosiloxane and reinforcing filler together and storing for a period of time. The silicone polymer-filler mixture can be used in silicone mixtures used as insulating compounds, in greases, or in producing elastomers in the well-known methods of producing such products.

The silicone polymer-filler mixture produced by the method of this invention can be used in producing curable compositions which yield cured silicone elastomer. A common method is the addition of an organic peroxide vulcanizing agent to the filled polydiorganosiloxane. The organic peroxide vulcanizing agents suitable for use in silicone elastomers are well known. If the polydiorganosiloxane does not contain any vinyl radicals, it preferably is vulcanized with organic peroxides that are efficient in causing reactions in such polydiorganosiloxanes. Such organic peroxides are labeled "non-vinyl specific" and are represented by such organic peroxides as benzoylperoxide, and 2,4-dichlorobenzoylperoxide. If the polydiorganosiloxane contains vinyl radicals, it can be vulcanized with either "non-vinyl specific" or "vinyl specific" organic peroxides. Representative of the vinyl specific organic peroxides are ditertiary-butyl peroxide and 2,5-bis-(tert-butylperoxy)-2, 5-dimethylhexane. The properties of the cured silicone elastomer can be altered by the type and amount of vulcanizing agent used to cure the composition. Typical changes due to such choices are well recognized in the art. The organic peroxide vulcanizing agent can be present in amounts from 0.1 to 5 parts by weight per 100 parts by weight of the filled polydiorganosiloxane, preferably from 0.5 to 2.0 parts by weight.

A variety of systems are known in the art for producing room temperature vulcanizing compositions which contain a filled hydroxyl-containing polydiorganosiloxane. A number of methods are known for combining hydroxyl-containing polydiorganosiloxane in an essentially anhydrous mixture with a curing agent to yield a one part curable composition. These compositions cure to silicone elastomers upon exposure to the atmosphere. Methods are available based upon tri-functional and tetra-functional silanes as crosslinking agents as well as low molecular weight polymeric crosslinkers. Among the functional groups used are acetoxy radicals, alkoxy radicals, amino radicals, and amido radicals. Common crosslinkers include those represented by the formulas:

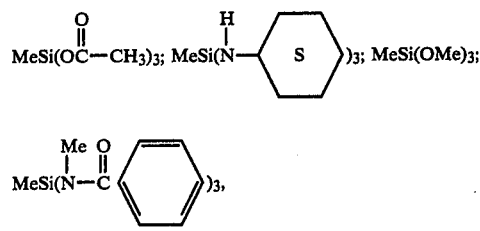

and MeSi(O—N=CEtMe)$_3$, and MeSi(ONEt$_2$)$_3$ where Me is the methyl radical and Et is the ethyl radical. Common catalysts for these systems include metal carboxylates, alkyl metal carboxylates, and alkyl metal alkoxides and titanates. Preferred are stannous octoate, dibutyltindiacetate, dibutyltindilaurate, tetrabutyltitanate, dibutyltindimethoxide, and tetraisopropyltitanate. Methods of producing one part compositions which cure to silicone elastomers upon exposure to moisture based upon hydroxyl-containing polydiorganosiloxanes in which the silicone polymer-filler mixture of this invention can be substituted for the hydroxyl containing polydiorganosiloxane include those disclosed in U.S. Pat. Nos. 3,077,465, issued Feb. 12, 1963 to Bruner; 3,189,576, issued June 15, 1965 to Sweet; 3,294,739, issued Dec. 27, 1966 to Weyenberg; and 3,334,067, issued Aug. 2, 1967 to Weyenberg; all of which are incorporated by reference to teach methods of mixing curing agents into hydroxyl containing polydiorganosiloxanes in which the silicone polymer-filler mixture of this invention can be substituted to yield compositions stable in the absence of moisture which cure to silicone elastomers upon exposure to moisture.

Methods are well known for combining hydroxyl-containing polydiorganosiloxanes with curing agents that produce two part products which cure at room temperature upon mixing the ingredients. Examples of such methods in which the silicone polymer-filler mixture of this invention can be substituted for the hydroxyl-containing polydiorganosiloxanes are found in U.S. Pat. Nos. 3,061,575, issued Oct. 3, 1962 to Russell; 3,184,427, issued May 18, 1965 to Russell et al.; 3,509,081, issued Apr. 28, 1970 to Gignac, Jr; and 3,989,668, issued Nov. 2, 1976 to Lee et al., all of which are incorporated by reference to teach methods of mixing curing agents into hydroxyl-containing polydiorganosiloxane in which the silicone polymer-filler mixture of this invention can be substituted to yield compositions which cure to silicone elastomers.

When the silicone polymer-filler mixture contains two or more unsaturated monovalent aliphatic radicals per polymer molecule such as vinyl and allyl radicals, it can be combined with a curing agent comprising an organohydrogensiloxane having an average of greater than two silicon-bonded hydrogen atoms per molecule and a platinum-containing catalyst in an amount sufficient to provide at least one part by weight platinum per million parts by weight polydiorganosiloxane. The organohydrogensiloxane consists of R'''HSiO, $R_2'''HSiO_{0.5}$, $R_2'''SiO$, $R_3'''SiO_{0.5}$, and $SiO_2$ units in which each R''' is selected from the group consisting of methyl, ethyl, vinyl, phenyl 3,3,3-trifluoropropyl, and 2-cyanoethyl radicals. The organohydrogensiloxane is present in sufficient quantity to provide at least one silicone-bonded hydrogen atom per unsaturated monovalent aliphatic radical in the polydiorganosiloxane. The polydiorganosiloxane in the mixture preferably contains from 0.01 to 2.0 mole percent unsaturation. Examples of such curing methods are found in U.S. Pat. Nos. 3,697,473, issued Oct. 10, 1973, to Polmanteer et al.; 3,445,420, issued May 20, 1969, to Kookootsedes et al.; and 4,032,502, issued June 28, 1977, to Lee et al., all of which are incorporated by reference to teach methods of mixing curing agents into diorganosiloxanes containing unsaturated monovalent aliphatic radicals in which the stable silicone polymer-filler mixture of this invention can be substituted for the diorganosiloxane to produce curable compositions.

Compositions which cure to elastomers may also contain minor amounts of the usual additives to improve heat stability, handling, compression set, oil resistance, etc.

The following examples are included for illustrative purposes only and should not be construed as limiting the invention which is properly set forth in the appended claims. All "parts" are "parts by weight".

EXAMPLE 1

A high viscosity polydiorganosiloxane was prepared in the presence of calcium carbonate filler.

A resin kettle was fitted with a stirrer, heater, nitrogen sweep, vacuum attachment, and Dean-Stark Trap. Then 100 parts of a hydroxyl-endblocked linear polydimethylsiloxane having about 1.2 weight percent hydroxyl groups and a viscosity of about 0.08 Pa·s at 23° C., with an average degree of polymerization of about 40, (Polymer A), was mixed with 120 parts of finely divided calcium carbonate and placed into the resin kettle. The kettle was heated to 105°–115° C. with the stirrer and nitrogen sweep operating. Then 0.14 part of tetra-n-butyl-phosphonium dimethylsilanolate catalyst was added. After 80 minutes at this temperature the viscosity of the mixture had not changed. The kettle was cooled.

The kettle was evacuated to a pressure of 1.5 kPa and heated to 115° C. After 40 minutes under these conditions there was no evident change in viscosity. An additional 0.83 part of the catalyst was added and vacuum reapplied. There now was about 1 phosphorous atom per 3000 silicone atoms in the polydimethylsiloxane. Polymerization was evident in 4 minutes when the pressure had reached 3.3 kPa because the viscosity started to rise and water appeared in the Dean Stark trap. The vacuum and heating were turned off 6 minutes after the catalyst addition and the kettle was quickly cooled. Effective reaction time was about 6 minutes. The cooled mixture had a viscosity observed to be much higher than about 1400 Pa·s at a shear rate of 0.63 sec.$^{-1}$.

The catalyst in the mixture was decomposed by heating the mixture in an air circulating oven for 45 minutes at which time the mixture temperature was about 180° C.

A sample of the mixture was extracted with a toluene-ammonium hydroxide mixture to separate the polymer from the filler. The polymer showed a peak molecular weight of 157,000 by gel permeation chromatography analysis. The original polydimethylsiloxane had a peak molecular weight of about 2200. This shows the hydroxyl endblocked polydimethylsiloxane was polymerized in the presence of the calcium carbonate filler.

The mixture was passed through a 3-roll mill to further disperse the calcium carbonate in the polymer, then 100 parts of the mixture was combined with 2.0 parts of methylvinyldi(N-methylacetamido)silane chain extender and 1.5 parts of an aminoxy-functional siloxane crosslinker, an N,N-diethylaminoxy polydimethylsiloxane having about 5 aminoxy groups per molecule, under anhydrous conditions. The mixture was then spread out into a test slab 1.5 mm thick and cured for 7 days exposed to the air. The physical properties were then measured as durometer, Shore A, 11; tensile strength, 0.45 MPa (megaPascal); elongation, 1150 percent; and tear strength, die B, 4.0 kN/m (kiloNewton per meter) showing a useful cured product.

The above method was repeated using 100 parts of Polymer A, 120 parts of the calcium carbonate, and 0.48 parts of the tetra-n-butyl-phosphonium dimethylsilanolate. This was about 1 phosphorus atom per 6000 silicon atoms. After 20 minutes at 115° C. and a pressure of 1.5 kPa there was no reaction evident as the viscosity did not change. As shown above, the reaction time under given reaction conditions must be sufficient to cause polymerization.

EXAMPLE 2

The process of Example 1 was followed adding 100 parts of Polymer A and 10 parts of fumed silica having about 250 m$^2$/g surface area to the kettle, and heating to 110° C. Then 0.83 part of the tetra-n-butyl phosphonium dimethylsilanolate was added (1 phosphorous atom per 3500 silicon atoms) and the kettle was evacuated to a pressure of 3.06 kPa. After 35 minutes with the pressure reduced to 1.73 kPa and the temperature at 110° C., no viscosity change was evident. The contents were cooled, then reheated to 105° C. under a pressure of 0.8 kPa. After 28 minutes at these conditions the contents had polymerized to a viscosity high enough to stop the stirrer, with 5 parts of condensate present in the Dean-Stark Trap. The contents of the kettle were cooled, then heated to above 160° C. to decompose the catalyst. A sample extracted as in Example 1 had a peak molecular weight of 179,000 showing polymerization of the Polymer A in the presence of the fumed silica filler.

A portion of this mixture was 3-roll milled, then 100 parts of the milled product was mixed under anhydrous conditions with 5.5 parts of crosslinker. The crosslinker consisted of 100 parts of a mixture consisting of an equal molar mixture of ethyltriacetoxysilane and methyltriacetoxysilane and 0.5 part of dibutyltindiacetate. A test slab was prepared by cold pressing a portion of the mixture into a slab about 1.5 mm thick, then exposing the slab to the atmosphere (23° C., 50% relative humidity) for 3 days and then heated for about 2.5 minutes in an air-circulating oven at 200° C. The properties were measured as: durometer, Shore A, 19; tensile strength, 1.48 MPa; elongation, 365 percent; and tear strength, die B, 4.02 kN/m showing a useful cured product.

Another portion of the above mixture was catalyzed by mixing with 1.5 parts of 2,4-dichlorobenzoyl peroxide, as a 50 percent by weight mixture with an inert carrier, based upon 100 parts of the polymer-filler mixture. The catalyzed mixture was press molded for 5 minutes at 120° C. into a test slab. The slab properties were measured as: durometer, Shore A, 16; tensile strength, 1.38 MPa; elongation, 350 percent; and tear strength, die B, 3.85 kN/m.

EXAMPLE 3

The procedure of Example 1 was followed using 100 parts of Polymer A and 100 parts of calcium carbonate. The mixture was heated to 122° C. under a pressure of 10.7 kPa, then 0.30 part of the tetrabutylphosphonium dimethylsilanolate catalyst was added (1 phosphorus atom per 10,000 silicon atoms). Heating and vacuum were continued for 1 hour, but no viscosity change was evident. An additional 0.30 part of catalyst was added. The viscosity rose as polymerization took place in about 20 minutes. The polymerized mixture was heated to 180° C. to decompose the catalyst to yield a filled, hydroxyl-containing polydiorganosiloxane.

EXAMPLE 4

The procedure of Example 3 was repeated but using 75 parts of ground quartz having an average particle size of about 5 micrometers as the filler. The mixture was heated 2 hours after adding 0.6 part of the catalyst at 120° C. and 12 kPa pressure with no viscosity change evident. An additional 0.6 part of catalyst was added and the viscosity rose as polymerization took place in about 40 minutes at 120° C. and 1.2 kPa pressure. The total catalyst concentration was 1 phosphorus atom per 2500 silicon atoms. The mixture was heated to 190° C. to decompose the catalyst. The mixture seemed to thin somewhat during the decomposition of the catalyst, the viscosity of the final mixture was higher than that of the beginning mixture, showing polymerization had taken place.

EXAMPLE 5

The procedure of Example 3 was repeated but using 20 parts of precipitated silica having a surface area of about 150 m²/g. The mixture was heated to 122° C. under a pressure of 10.7 kPa, then 1.2 parts of the tetrabutylphosphonium dimethylsilanolate catalyst was added (1 phosphorus atom per 2500 silicon atoms). The mixture was heated under the vacuum for 2 hours with no thickening. An additional 0.6 part of catalyst was added and heating under vacuum continued 1 hour. When another 0.6 part of catalyst was added it was found that the vacuum hose had been restricted at the resin kettle. The restriction was removed and heating continued at 130° C. under pressure of 1.3 kPa. The viscosity rose as polymerization occurred very rapidly. After 20 minutes the vacuum was removed. The polymerized mixture was heated to 200° C. to decompose the catalyst.

The mixture was converted to a sealant and cured by exposure to the moisture in the air. The cured material had a durometer, Shore A, of 51; tensile strength, 1.89 MPa; elongation, 220 percent; and tear strength, die B, 3.7 kN/m showing the usefulness of the cured silicone polymer-filler mixture.

EXAMPLE 6

The procedure of Example 1 was repeated using 100 parts of the Polymer A and 10 parts of the fume silica of Example 2. After heating the mixture to 150° C. under a pressure of 6.7 kPa to remove any moisture present, the fluid mixture was catalyzed with 1.7 parts of potassium dimethylsilanolate catalyst (1 potassium atom per 1250 silicon atoms). Heating continued at a temperature of 160° C. and a pressure of about 6.7 kPa for 2 hours at which point the heating was stopped. The mixture stirred overnight under vacuum and became so viscous the stirrer had stopped by morning. The mixture was then neutralized by adding dry ice to provide a silica-filled hydroxylated polydimethylsiloxane.

That which is claimed is:

1. A method of polymerizing a hydroxyl endblocked polydiorganosiloxane in the presence of filler comprising
 (A) mixing (i) 100 parts by weight of polydiorganosiloxane of the formula HO(R₂SiO)ₓH wherein each R is a monovalent radical having from 1 to 18 carbon atoms selected from the group consisting of hydrocarbon radicals, halogenated hydrocarbon radicals, and cyanoalkyl radicals, and x is from 3 to 200 and (ii) from 1 to 150 parts by weight of filler selected from the group consisting of inorganic reinforcing filler and inorganic extending filler to form a mixture,
 (B) admixing sufficient catalyst of the formula MO(R₂SiO)zQ wherein M is an alkali metal, tetraalkylphosphonium, or tetraalkylammonium radical; Q is an alkali metal, tetraalkylphosphonium, tetraalkylammonium, or hydrogen radical; R is as defined above; and z is at least 1, to cause condensation of the polydiorganosiloxane (i), and
 (C) dehydrating the mixture by heating, at a temperature below that at which decomposition of the catalyst would occur, removing moisture for a time sufficient to polymerize the mixture, then
 (D) inactivating the catalyst, to yield a stable silicone polymer-filler mixture in which the silicone polymer has a molecular weight greater than that of (i).

2. The method of claim 1 in which each R is selected from the group consisting of methyl, ethyl, vinyl, phenyl, 3,3,3,- trifluoropropyl, and 2-cyanoethyl.

3. The method of claim 2 in which the catalyst of (B) is the product obtained by mixing an alkali metal hydroxide with diorganosilicon compound or low molecular weight diorganosiloxane and dehydrating.

4. The method of claim 3 in which the alkali metal hydroxide is potassium hydroxide wherein potassium diorganosilanolate is the catalyst, and the inactivating step (D) comprises neutralization with a weak acid.

5. The method of claim 2 in which the catalyst of (B) is the product obtained by mixing a quaternary phosphonium compound of the formula

R'₄PX wherein each R' is a monovalent hydrocarbon radical of 1 to 18 carbon atoms free of aliphatic unsaturation and X is chlorine, bromine, or iodine; a basic compound of the formula MOH where M is an alkali metal; and water, in at least sufficient quantity to dissolve the basic compound; with diorganosilicon compound or low molecular weight diorganosiloxane and dehydrating.

6. The method of claim 2 in which the catalyst of (B) is the product obtained by mixing a quaternary phosphonium compound of the formula $$R'_4POR''$$

wherein R' is a monovalent hydrocarbon radical of 1 to 18 carbon atoms free of aliphatic unsaturation and R'' is hydrogen or alkyl radical of 1 to 6 carbon atoms with diorganosilicon compound or low molecular weight diorganosiloxane and dehydrating wherein the product is a quaternary phosphonium diorganosilanolate.

7. The method of claim 5 wherein the catalyst is tetraalkylphosphonium diorganosilanolates and the inactivating step (D) comprises heating at a temperature above the temperature at which decomposition of the quaternary phosphonium compound occurs until the decomposition is completed.

8. The method of claim 6 in which the inactivating step (D) is heating at a temperature above which decomposition of the quaternary phosphonium diorganosilanolate occurs until the decomposition is completed.

9. The method of claim 4 in which the potassium diorganosilanolate is present in an amount sufficient to yield one atom of potassium from 1,000 to 10,000 atoms of silicon in the polydiorganosiloxane.

10. The method of claim 7 in which the tetraalkylphosphonium diorganosilanolate is present in an amount sufficient to yield one atom of phosphorus for from 1,000 to 10,000 atoms of silicon in the polydiorganosiloxane.

11. The method of claim 8 in which the quaternary phosphonium diorganosilanolate is present in an amount sufficient to yield one atom of phosphorus for from 1,000 to 10,000 atoms of silicon in the polydiorganosiloxane.

12. The method of claim 11 in which the mixture of (A) is heated in a controlled system to a temperature of higher than 100° C., but lower than the boiling point of (i) to remove water before step (B).

13. The method of claim 1 in which the filler (ii) is acidic and is present in an amount of from 1 to 40 parts by weight.

14. The method of claim 13 in which the filler is colloidal silica.

15. The method of claim 1 in which the filler (ii) is basic or neutral and is present in an amount of from 1 to 150 parts by weight.

16. The method of claim 15 in which the filler is calcium carbonate.

17. The method of claim 10 in which the tetraalkylphosphonium diorganosilanolate is tetra-n-butylphosphonium dimethylsilanolate in an amount sufficient to yield one atom of phosphorus for from 1,000 to 5,000 atoms of silicon in the polydiorganosiloxane, the filler is from 1 to 40 parts by weight of a colloidal silica, the heating temperature of step (C) is from 100° C. to 130° C. and the catalyst is inactivated in step (D) by heating the mixture to a temperature of from 160° C. to 200° C. for a time sufficient to decompose the tetra-n-butylphosphonium diorganosilanolate.

18. The method of claim 1 in which the silicone polymer-filler mixture is further mixed with curing agent to yield a curable composition.

19. The method of claim 18 in which the curing agent is an organic peroxide suitable for curing silicone elastomers.

20. The method of claim 18 in which the curing agent is a crosslinking agent capable of combining with the polydiorganosiloxane to yield a composition stable in the absence of moisture which cures to a silicone elastomer upon exposure to moisture.

21. The method of claim 18 in which the polydiorganosiloxane has from 0.01 to 2.0 percent vinyl or allyl radicals, there being at least 2 vinyl or allyl radicals per molecule, and the curing agent comprises an organohydrogensiloxane in sufficient amount to provide at least 1 silicon-bonded hydrogen atom per vinyl or allyl radical in the polydiorganosiloxane, said organohydrogensiloxane having an average of greater than two silicon-bonded hydrogen atoms per molecule, and consisting of $R'''HSiO$, $R_2'''SiO$, $R_2'''HSiO_{0.5}$, $R_3'''SiO_{0.5}$, and $SiO_2$ units in which each $R'''$ is selected from the group consisting of methyl, ethyl, vinyl, phenyl, 3,3,3-trifluoropropyl, and 2-cyanoethyl; and a platinum catalyst in an amount sufficient to provide at least one part by weight of platinum per million parts by weight of silicone polymer in the silicone polymer filler mixture.

22. The silicone polymer-filler mixture produced by the method of claim 1.

23. The silicone polymer-filler mixture produced by the method of claim 9.

24. The silicone polymer-filler mixture produced by the method of claim 12.

25. The silicone polymer-filler mixture producted by the method of claim 13.

26. The silicone polymer-filler mixture produced by the method of claim 15.

27. The silicone polymer-filler mixture produced by the method of claim 17.

28. The curable composition produced by the method of claim 18.

29. The curable composition produced by the method of claim 19.

30. The curable composition produced by the method of claim 20.

31. The curable composition produced by the method of claim 21.

32. The cured product of claim 28.

* * * * *